Figure 5:
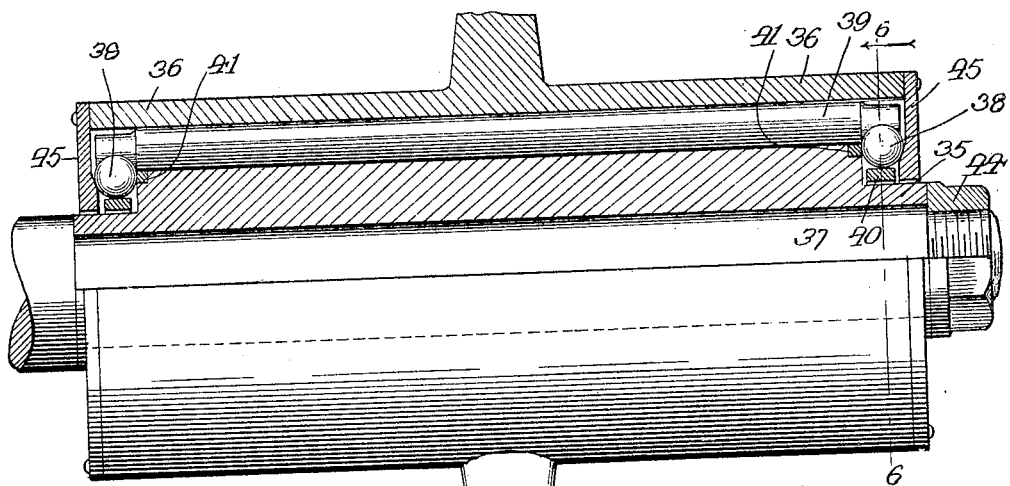

No. 822,297. PATENTED JUNE 5, 1906.
E. J. NEWTON.
BEARING.
APPLICATION FILED JUNE 12, 1905.
3 SHEETS—SHEET 1.
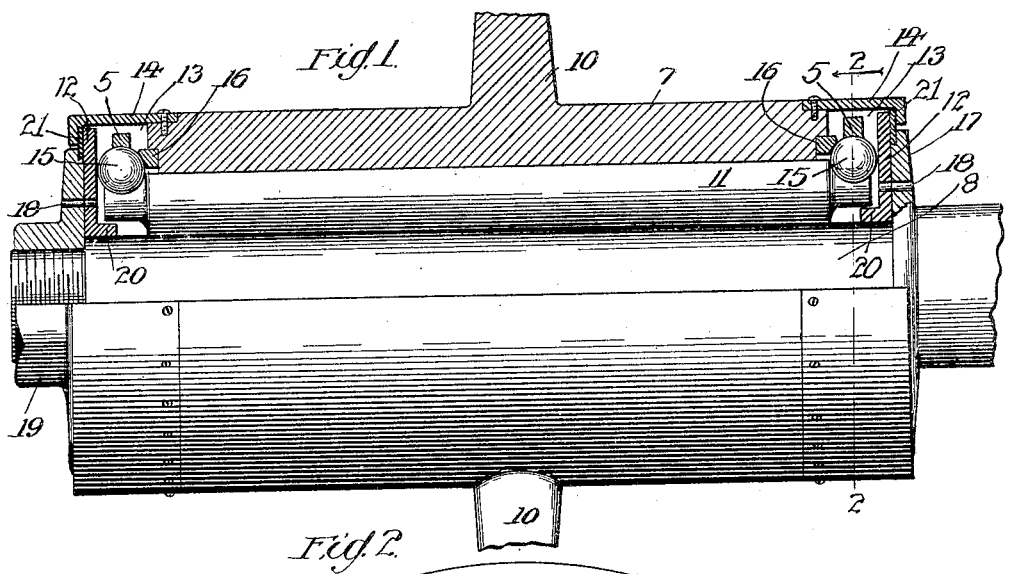
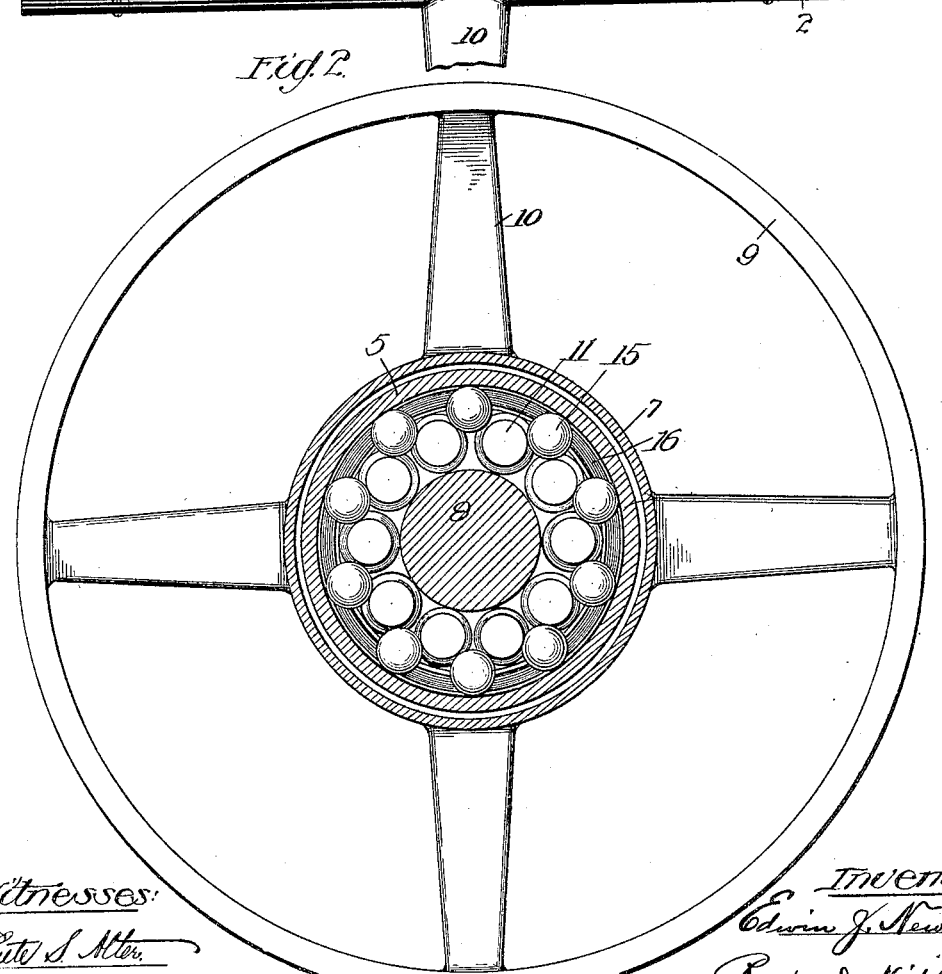
Witnesses:
Lute S. Alter.
Edwin H. Smythe.
Inventor:
Edwin J. Newton
by Rector & Hibben
His Attorneys No. 822,297. PATENTED JUNE 5, 1906.
E. J. NEWTON.
BEARING.
APPLICATION FILED JUNE 12, 1905.
3 SHEETS—SHEET 2.
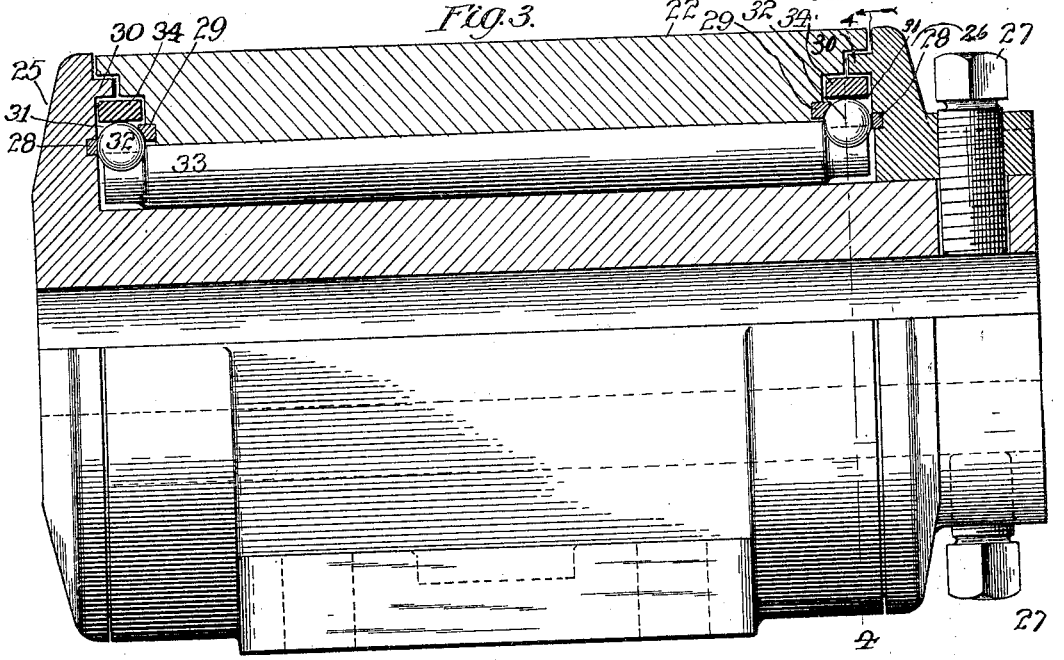
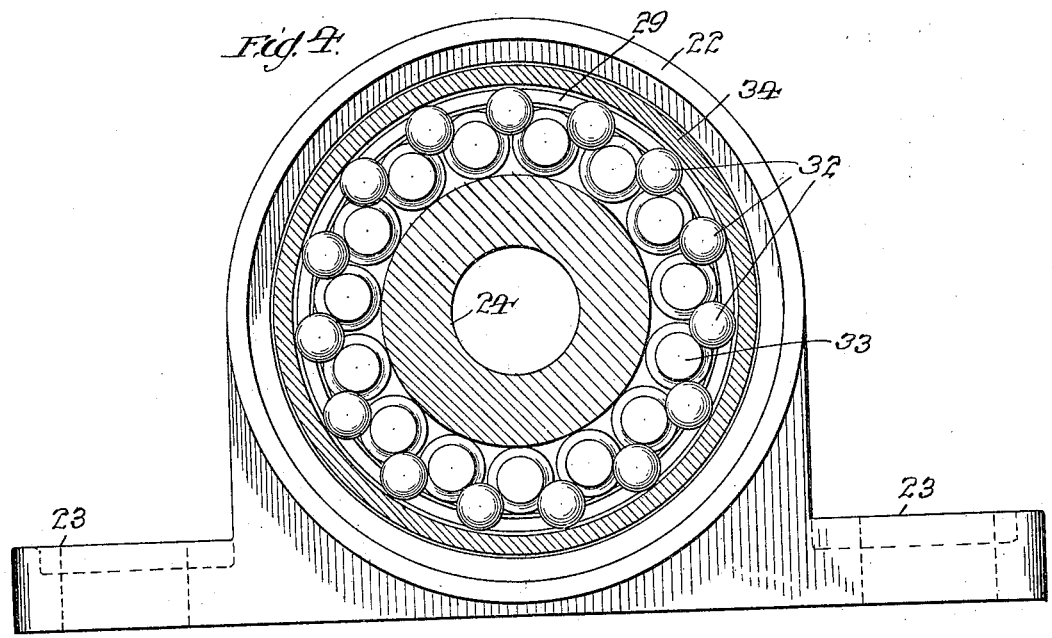

No. 822,297. PATENTED JUNE 5, 1906.
E. J. NEWTON.
BEARING.
APPLICATION FILED JUNE 12, 1905.

3 SHEETS—SHEET 3.

UNITED STATES PATENT OFFICE.

EDWIN J. NEWTON, OF CHICAGO, ILLINOIS, ASSIGNOR TO WILLIAM R. EVERETT, OF CHICAGO, ILLINOIS.

BEARING.

No. 822,297.      Specification of Letters Patent.      Patented June 5, 1906.

Application filed June 12, 1905. Serial No. 264,830.

*To all whom it may concern:*

Be it known that I, EDWIN J. NEWTON, a citizen of the United States, residing at Chicago, in the county of Cook and State of Illinois, have invented certain new and useful Improvements in Bearings, of which the following is a specification.

My invention relates to a bearing of the type in which friction is minimized by the interposition of rolling bearing members between the rotating members; and my object is, generally speaking, to provide a bearing so constructed and arranged that the friction between the rotating parts will be reduced to a minimum whatever the running conditions may be to which it is subjected.

It is my object to provide a bearing of a simple and inexpensive construction in which the friction losses due to end thrust, as well as those due to the cross thrust on the bearing, will be kept at the lowest point possible. More particularly, my invention may be said to contemplate the provision of a bearing in which rolling spacing members interposed between the rolling bearing members which take the cross thrust of the bearing are so arranged between the bearing members proper that they serve to take the end thrust of the bearing.

Where the rotative members of the bearing have bearing-rollers interposed between them, it is necessary to provide spacing means to keep the rollers apart, as the adjacent surfaces of the rollers move in opposite directions, and if they were allowed to come into contact would produce very considerable friction. The separation of the rollers in some instances has been effected by means of balls interposed between them, the balls, however, acting only to space the rollers and keep them from endwise displacement with relation to that one of the rotative members with which they are associated and having no other function. In accordance with my invention I so place the spacing-balls in the bearing that they act not only to space the rollers and keep them in their proper relative position, but, also, by virtue of their interposition between the rotative or bearing members proper, to take the end thrust of these members and prevent their endwise displacement. Furthermore, I have found that where the balls are made to serve the double duty of spacing the rollers and taking the end thrust of the bearing there is a tendency for them to be displaced in the rotation of the bearing at a certain rate as a result of their spacing relation to the rollers, and at another rate as a result of their end thrust bearing relation to the bearing members, this action resulting in the development of a sliding or grinding friction. This tendency I have corrected by placing the balls in a certain peculiar relation to the members with which they coöperate, as will hereinafter more fully appear.

Figure 6:
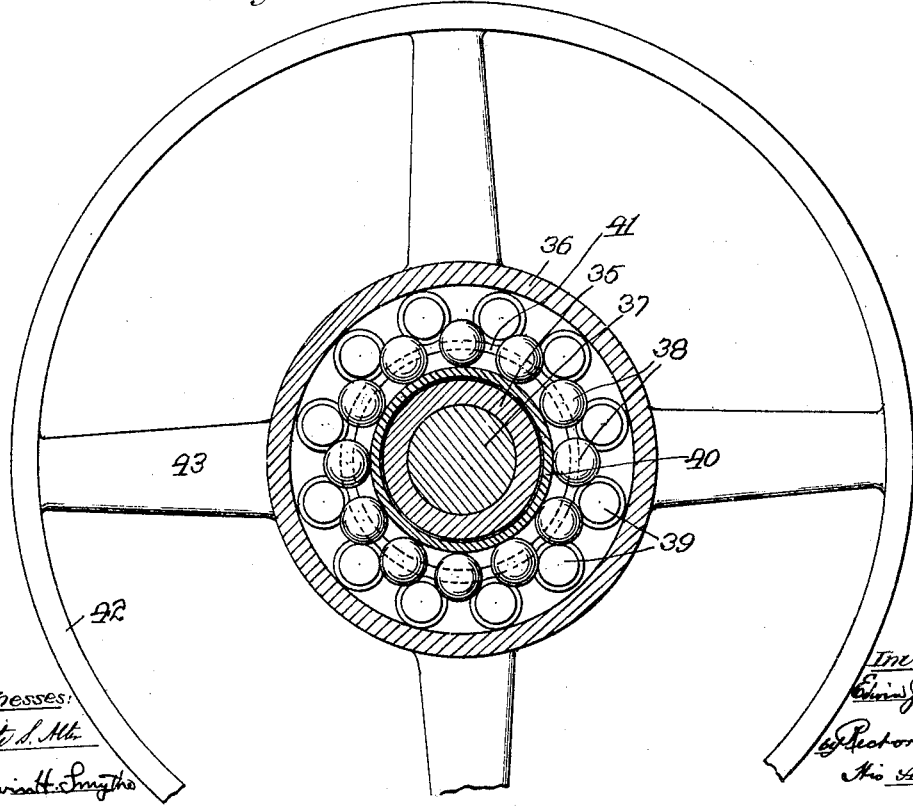

Referring to the accompanying drawings, Figure 1 is a longitudinal view, partly in section, of a bearing embodying my invention. Fig. 2 is a cross-sectional view of this bearing taken on line 2 2 of Fig. 1. Fig. 3 is a longitudinal view, partly in section, of a slightly-modified form of bearing embodying my invention. Fig. 4 shows a cross-section of the bearing of Fig. 3, taken on line 4 4 thereof. Fig. 5 is a view, partly in section, of another modification, in which the spacing and end-thrust bearing members are disposed within the circle of the roller-bearings instead of outside, as in the two preceding forms; and Fig. 6 is a cross-sectional view of the modification illustrated in Fig. 5, taken on line 6 6 thereof.

In the modification of my invention illustrated in Figs. 1 and 2 the bearing is shown to consist of the hub or bearing-box 7, supporting a wheel 9 by means of the spokes 10, and a shaft or axle 8 within the hub 7. The hub or box 7 and the shaft or axle 8 in the present instance comprise the two relatively rotative members of the bearing. The external diameter of the shaft or axle is made less than the internal diameter of the hub, and between them are interposed a number of rolling bearing members 11, which preferably are rollers, as shown. The number of these rollers may be varied at will to adapt them to the varying proportions of the parts with which they are associated. They are preferably of relatively small diameter, as it is advantageous in the practice of my invention that there be no great difference in the diameters of the hub and the axle. The ends of the rollers are preferably reduced in diameter and project beyond the ends of the hub into annular spaces 13, formed between the ends of the hub and cap-plates 12, preferably secured to and rotating with the shaft. The circumference of each of these annular spaces is closed by a ring or flange 14, which in the present instance I have shown as being a separate part secured to the hub by means of a series of screws. The annular spaces 13 serve as bearing housings or cages, and within each of them is placed a series of bearing-balls 15, which are so arranged with relation to the ends of the bearing-rollers that project into the housing that a ball is interposed between each roller and its neighbor. To keep the balls from radial displacement, I prefer to provide in connection with each series a retaining-ring 5, which ring is not in contact with anything excepting the balls and is free to move with them without occasioning any grinding-friction.

In addition to their spacing function which they have by virtue of their position between the projecting ends of the roller-bearing members, I arrange the balls so that they may exercise an additional function as end-thrust bearing members, and this in the present instance I accomplish by so disposing the balls with relation to the end of the hub or bearing-box and its opposed cap-plate 12, associated with the shaft or axle, that they are interposed between the surfaces of these parts in position to take the end thrust between them. In the present instance I have illustrated the end or lateral bearing-surfaces of the hub or bearing-box 7 as consisting of rings 16, preferably of hardened steel or like material, let into the ends of the hub; but it will be understood that the ends of the hub itself might be adapted to take the place of these bearing-rings. The cap-plates 12, which in the present instance constitute the lateral bearing-surfaces of the shaft or axle and coöperate with the balls 15 and the ends of the hub in taking the end thrust, are held in place by inwardly-projecting flanges on the housing-rings 14, but are arranged to be freely rotatable within the housing-rings. In the form of bearing illustrated in Figs. 1 and 2 the cap-plate on one end of the axle is held in position by the butting flange 17 on the axle and is secured to the flange, so as to rotate with the axle by means of pins 18, seated in one of the members and passing loosely into corresponding holes in the other member, so that the flange cap-plate may be separated by a relatively longitudinal movement. The cap-plate at the other end of the axle is secured to the nut 19 in a similar manner, the two being separated when it is desired to remove the bearing-journal from the axle by unscrewing the nut, the cap-plate being free to rotate with the nut, and the loose connection of the pins with one or the other of the members permitting them to separate longitudinally. The cap-plates 12 are centrally perforated to permit the axle to pass through them and are provided with flanges 20, projecting inwardly from the edge of the central perforation to engage the ends of the roller-bearing members 11 and retain them in position when the bearing-box is removed from the axle. In order to prevent dust from entering the housing of the bearing, I preferably place washers 21, of felt or other suitable material, between the housing-flanges 14 and the associated cap-plates 12.

It will be observed that in the bearing illustrated in Figs. 1 and 2 the surfaces of the end bearing-rings 16, that engage the balls 15, are disposed at an angle to the coöperating end-thrust bearing-surfaces of the associated cap-plates, bringing the point of contact with each ball into a position somewhat removed from a point diametrically opposite the point of contact of the ball with the associated end cap-plate. This is done in order to cause the travel of the balls, resulting from their engagement with the end-thrust bearing-surfaces, to equal their travel due to their interposition as spacing members between the ends of the rollers.

The angular displacement of a ball or roller relative to circular bearing-surfaces which it engages, as is well known, is in the inverse ratio of the diameters of the surfaces. For instance, in the bearing members shown in Figs. 1 and 2 the ratio of the internal diameter of the hub to the external diameter of the shaft is as illustrated approximately two to one, and in one complete rotation of the members the angular displacement of the bearing-rollers is approximately one hundred and twenty degrees on the hub and two hundred and forty degrees on the axle. Inasmuch as the balls are interposed between and carried around by the rollers, and at the same time are also engaging the lateral surfaces of the bearing members to take the end thrust, it is necessary in order to prevent sliding or grinding friction of the balls between the end bearings to so adjust the bearing-surfaces with relation to the balls that in one complete revolution of the parts they will be displaced upon the two members to relatively the same degree that they are displaced by the travel of the rollers—that is, one hundred and twenty degrees on the hub and two hundred and forty degrees on the axle. If the two lateral bearing-surfaces should engage the ball at diametrically-opposite points, the displacement of the ball relative to the two members would be one hundred and eighty degrees on each, with the result that the ball would have to slide during each complete revolution of the bearing for a distance equal to the difference between its displacement as a spacing member and its displacement as an end-thrust bearing member—that is, sixty degrees; but if one of the bearing-surfaces is made to touch the ball at a point at right angles to the axis of its rotation due to its engagement with the lateral bearing-surfaces while the other is displaced to touch it at a point which forms an angle less than ninety degrees with its lateral axis of rotation and is consequently nearer to the axis than the point where the other bearing-surface engages it the travel or displacement of the ball on that surface will be less than on the surface engaging the more remote point, and the relative travel on the two surfaces will be in the ratio of the distances of their contacting points from the axis of rotation of the ball; but in order to obtain the disposition of the balls relative to the bearing members that gives the minimum sliding friction it is necessary to take into account another factor, and that is the rotation of the balls on their own axes imparted to them by their engagement with the ends of the bearing-rollers. Referring to Fig. 2, for instance, and assuming that the shaft of axle 8 is caused to make one complete revolution in a clockwise direction, the hub 7 remaining stationary, it will be seen that the rollers 11 will be caused to rotate in a counter clockwise direction, and that the balls 15 interposed betwen their ends will be caused to rotate in a clockwise direction in addition to being displaced bodily through an angle of approximately two hundred and forty degrees on the axle and one hundred and twenty degrees on the hub. As the ball is being bodily carried around in a clockwise direction and at the same time is rotating on its own axis in a clockwise direction, the result is that the rate of movement of the surface of the ball at the point adapted to engage the bearing-ring 16 relative to the surface of the bearing-ring is equal to its bodily displacement plus its own rotation, the relative movement being greater as the bearing-surface is situated farther out from the longitudinal axis of rotation of the ball. On the other hand, the cap-plate 12, which constitutes the other lateral bearing member and which coöperates with the bearing-ring 16 in taking the end thrust of the bearing, is arranged to contact with the balls at one end or pole of the longitudinal axis of rotation of each ball, and hence the rate of movement of this portion of the surface of the ball relative to the bearing-surfaces on the cap-plate is merely the rate of bodily displacement of the ball. Consequently in order to correlate the bodily displacement of the ball due to its position as a spacing member its rotation due to its contact with the ends of the rollers and its movement due to its engagement with the end-thrust bearing-surfaces it is desirable to so adjust the end-thrust bearing-surfaces that the distance from the lateral axis of rotation of the ball—that is, the axis of rotation due to its engagement with the end-thrust bearing-surfaces—to its point of contact with the bearing-surface associated with the outside member of the bearing shall bear approximately the same ratio to the radius of the ball that the rate of movement of the surface of the ball relative to the end thrust bearing-surface associated with the inner member bears to the rate of movement of the surface of the ball relative to the end thrust bearing-surface associated with the outer member of the bearing. As the perpendicular distance from the axis of rotation of the ball to any point on its surface is the cosine of the angle which is produced with reference to the axis of rotation by a radius drawn to that point, and assuming that the axis of rotation of the ball due to its action as an end-thrust bearing member is in the plane of rotation of the entire bearing, I may express the proper disposition of the end-thrust bearing-surfaces relative to the balls as being such that the cosine of the angle between the outer or hub contacting point and the axis of rotation shall bear approximately the ratio to one that the travel or movement at the contacting point of the ball with the bearing-surface associated with the inner member or axle bears to the travel or movement of the surface of the ball at its contacting point with the bearing-surface associated with the outer member or hub. With this relation of the end-thrust bearing-surfaces it results that the engagement of the surface of the ball with either of the end-thrust bearing-surfaces, taken in connection with the rotation due to its engagement with the roller-bearings, produces a resultant gyratory movement of the ball that causes its surface at the other end-thrust bearing-surface to move at a rate approximately equal to the rate of movement of that surface relative to the ball and in the same direction, so that the contact between the two is rolling and not sliding.

It should be understood that although I find it desirable to employ the above-described relation of the end-thrust bearing-surfaces to the balls I do not regard it as essential to my broad invention, which, as is apparent, is directed rather toward the use of spacing members arranged to exercise the additional function of end-thrust bearing members.

In correlating the various movements of the ball in the manner described in the foregoing, by displacing one of the end-thrust bearing-surfaces from a position diametrically opposite the other it is desirable that the displacement be made as small as possible consistent with securing the required result. As the need for displacement is primarily due to the unequal rate of travel of the rollers, carrying the balls as spacing members, on the inner and outer members of the bearing, and as the inequality of travel increases with increasing difference in the diameters of the two bearing members it is desirable to construct the bearing members of as nearly equal diameter as practical and to separate them by bearing-rollers of correspondingly small diameter. I have found in practice that in order to prevent the necessity of such displacement of the end-thrust bearing-surface associated with the outer bearing member from a position diametrically opposite its coöperating end-thrust bearing member as would result in the end thrust causing a wedging action on the ball it is well to keep the diameter of the roller three-sixteenths or less of the diameter of the inner bearing member or axle. In the present instance I have shown the bearing-surface at the end of the hub as being of straight cross-section and disposed tangentially to the ball at the point of contact. This arrangement is preferable for the reason that it offers only one point of contact with the ball and affords less opportunity for developing sliding or grinding friction.

In Figs. 3 and 4 I have illustrated my invention as applied to a bearing in which the hub or bearing-box is fixed, while the axle is rotatable. In this modification the hub or bearing-box 22 is provided with a base having lugs 23, by means of which it may be secured to any suitable support. The axle 24 is in the present instance shown hollow and provided with an end flange 25, which serves as the cap-plate for one end of the bearing. At the other end of the bearing is a cap-plate 26, which is secured to the shaft by means of the bolts 27, which penetrate an annular flange on said cap-plate and extend into corresponding holes in the shaft. The cap-plate 26 and the part 25 on the end of the shaft that serves as the other cap-plate of the bearing are each in the present instance provided with a bearing-ring 28, let into the inner surface of the plate to engage the bearing-balls. Each is also provided with an annular flange 30, coöperating with a flanged portion of the hub or bearing-box to close the circumference of the bearing-housing 31, which is formed between each end of the hub and the associated cap-plate. Within this housing are placed balls 32, which serve to space the bearing-rollers 33, interposed between the hub and the shaft, and which also serve as end-thrust bearings, being interposed between the bearing-ring 28 on each cap-plate, and the coöperating bearing-ring 29, carried on that end of the hub.

It will be understood that the bearing-rings 28 and 29 may be dispensed with by suitably arranging those portions of the surfaces of the cap-plates and of the hub to perform their office. Each series of balls is held in position by a retaining-ring 34, which encircles the series and is free to rotate with the balls without engaging any other part of the bearings.

It will be noted that in the modification illustrated in Figs. 3 and 4, as in that shown in Figs. 1 and 2, the end-thrust bearing-rings 28 and 29 are so disposed with relation to the series of balls with which they engage that the travel of the balls is relatively greater on bearing-ring 28 than on bearing-ring 29 to correspond with their travel as spacing members for the roller-bearings 33, the angular displacement of which is greater relative to the axle than to the hub. The bearing-surface of each ring is also preferably plane in order that it may be tangential to the bearing-balls to minimize friction therewith.

Figs. 5 and 6 illustrate another one of the many modified forms in which my invention may be embodied. This modification differs from the forms previously described primarily in locating the spacing and end-thrust bearing-balls within the circle of the roller-bearing members instead of outside. The bearing comprises a hub or bearing-box 36, supporting a wheel 42 by means of spokes 43. Within the hub 36 is a sleeve 35, which is adapted to encircle the end of the shaft or axle 37 and to be secured thereto by means of the nut 44. The hub or bearing-box 36 and the sleeve 35 in the present instance constitute the two relatively rotative members of the bearing. Between these members are interposed a number of roller-bearing members 39, the ends of which are reduced in diameter and extend into the ends of the sleeve 35 and the centrally-perforated cap-plates 45, firmly secured to the ends of the hub 36. Contained in each of these housings is a series of balls which lie within the circle of the protruding ends of the rollers. The balls 38 are interposed between the ends of the rollers to space them apart and are kept in position against moving radially inward by means of a loose ring 40.

The sleeve 35 is provided with lateral bearing-surfaces, arranged in the present instance to contact with the sides of the balls 38 by turning down each end of the sleeve sufficiently to permit the retaining-ring 40 and the balls, to half their diameter, to be within the outer circumference of the sleeve. The portion of the end of the sleeve that is adapted to come in contact with the balls is preferably provided with a bearing-ring 41, of hardened steel or other suitable material. The lateral bearing-surface, which is adapted to coöperate with the lateral bearing-surface of the sleeve 35, is carried by the cap-plate 45 and in the present instance is formed on the inner surface of the cap-plate itself. This coöperating bearing-surface is disposed at an angle to the coöperating bearing-surface on the end of the sleeve to equalize the displacement of the balls as end-thrust bearing members with relation to their displacement as spacing members, as more fully described in the foregoing in connection with the other modifications. It will be observed that in the form illustrated in Figs. 5 and 6, on account of the inner bearing-contact of the balls being with the inner sleeve, while their outer bearing-contact is with a bearing-surface carried by the hub, the inner or sleeve bearing-surface lies in the plane of rotation of the members, while the outer or hub bearing-surface is inclined at an angle thereto.

It will of course be understood that my invention is not necessarily limited to bearings in which the arrangement at the two ends of the bearing is in duplicate, as it is quite possible to employ my invention in a bearing one end only of which is provided with the novel construction which I have set forth in the foregoing.

I claim—

1. In a journal-bearing, the combination with the two relatively rotative members thereof, of roller-bearing members interposed between said rotative members, spacing-balls between the ends of said rollers, and parts carried by said rotative members adapted to bear against said spacing-balls, whereby the spacing-balls serve to take the end thrust.

2. In a bearing, the combination with the two relatively rotative members thereof, of a plurality of rollers interposed between said members, spacing-balls between the ends of said rollers, and bearing-surfaces carried on said rotative members and adapted to bear against spacing-balls on opposite sides of the plane of their contact with said rollers, whereby the spacing-balls serve both to space the rollers and to take the end thrust of the rotative members.

3. In a bearing, the combination with the two relatively movable bearing members, said members having lateral and longitudinal opposed bearing-surfaces, of a plurality of rollers interposed between the longitudinal bearing-surfaces of said members, a plurality of balls interposed between the lateral bearing-surfaces of said members, said balls being interposed between the ends of said rollers to act as spacing members therefor.

4. In a bearing, the combination with the two relatively movable members thereof, said members having lateral and longitudinal opposed bearing-surfaces, of a plurality of rolling bearing members interposed between the longitudinal bearing-surfaces of said rotative members, and a plurality of spacing-balls interposed between the ends of said rolling bearing members, said balls being also interposed between the lateral bearing-surfaces of said members to take the end thrust thereof.

5. In a bearing, the combination with the two relatively rotative members thereof, said members having opposed longitudinal and lateral bearing-surfaces, of a plurality of rollers interposed between the longitudinal bearing-surfaces of said members, a plurality of balls interposed between the lateral bearing-surfaces of said members, said balls being also interposed between the ends of said rollers to act as spacing members therefor, the lateral bearing-surfaces of said members being adapted to contact with said balls at points thereon less than one hundred and eighty degrees apart, whereby, in the rotation of said members, the displacement of said balls as end-thrust bearing members is made equal to their displacement as spacing members.

6. In a bearing, the combination with the two relatively rotative members thereof, said members being provided with longitudinal and lateral opposed bearing-surfaces, the lateral bearing-surface of one of said members being in a plane at an angle to the plane of the lateral bearing-surface of the other member, a plurality of rollers interposed between the longitudinal bearing-surfaces of said members, a plurality of balls interposed between the lateral bearing-surfaces of said members, said balls being also interposed between the ends of said rollers to act as spacing members therefor.

7. In a bearing, the combination with the two relatively rotative members thereof, said members having longitudinal and lateral opposed bearing-surfaces, said lateral surfaces being separated to form annular spaces therebetween, of a plurality of rollers interposed between the longitudinal bearing-surfaces of said members, the ends of said rollers being reduced in diameter, and projecting into said annular spaces, a plurality of balls confined in said annular space and interposed between the reduced ends of said rollers, to act as spacing members therefor, said balls being also interposed between the lateral bearing-surfaces of said members.

8. In a bearing, the combination with the two relatively rotative members thereof, said members having opposed longitudinal bearing-surfaces, of bearing-rings carried by said members, the bearing-surfaces of said rings being laterally opposed, a plurality of rollers interposed between the longitudinal bearing-surfaces of said members, a plurality of balls interposed between the lateral bearing-surfaces of the rings carried by said members, said balls being also interposed between the ends of said rollers to act as spacing members therefor.

9. In a bearing, the combination with the two relatively rotative members thereof, said members having longitudinal and lateral opposed bearing-surfaces, said lateral surfaces being separated to form annular spaces therebetween, of a plurality of rollers interposed between the longitudinal bearing-surfaces of said members, the ends of said rollers being reduced in diameter and projecting into said annular spaces a plurality of balls confined in said annular spaces and interposed between the ends of said rollers to act as spacing members therefor, and a ring loosely encircling said balls to maintain the same in position, said balls being also interposed between the lateral bearing-surfaces of said rotative members to take the thrust thereof.

10. In a bearing, the combination with two relatively rotative bearing members having longitudinally and laterally opposed bearing-surfaces, the external diameter of the interior member being less than the internal diameter of the exterior member, of a plurality of rolling bearing members interposed between the longitudinal bearing-surfaces of said members, a plurality of balls interposed between the lateral bearing-surfaces of said members, said balls being also interposed between the ends of said rollers to act as spacing members therefor, the bearing-point on each of said balls of the lateral bearing-surface of said exterior member being so placed that the cosine of the angle which the point of contact forms with the plane of rotation of the bearing has a ratio to one approximately equal to the ratio of the travel of the surface of the ball relative to the lateral bearing-surface associated with the interior member, to its travel relative to the lateral bearing-surface associated with the exterior member, whereby in the rotation of the members, the displacement of the balls, as end-thrust bearing members, is made approximately equal to their displacement as spacing members.

11. In a bearing, the combination with the bearing-box, of annular cap-plates closing the ends thereof, flanges on the ends of said bearing-box holding said cap-plates in position, a plurality of rollers within said box and arranged to bear upon the inner surface thereof, said cap-plates being provided with inwardly-extending flanges adapted to engage the ends of said rollers to hold the rollers in position, a plurality of balls contained within the annular spaces between the ends of said bearing-box and said cap-plates, said balls being interposed between the ends of said rollers to serve as spacing members, and lateral bearing-surfaces on each end of said bearing-box and on the inside of each cap-plate, said bearing-surfaces at each end of said bearing-box being adapted to engage opposite sides of said spacing-balls, whereby the spacing-balls serve to take the end thrust.

12. In a bearing, the combination with a bearing-box, and a plurality of bearing-rollers contained therein, of spacing-balls interposed between adjacent ends of said rollers, and a cap-plate held to the end of said bearing-box, said cap-plate and said bearing-box being provided with opposed lateral bearing-surfaces adapted to contact with said spacing-balls.

13. In a bearing, the combination with the bearing-box or hub, of centrally-perforated cap-plates rotatably mounted one at each end of said box in position to leave an annular space between each cap-plate and the end of the box, said cap-plates having flanges projecting inwardly from the edges of their central openings, a plurality of rollers contained within said bearing-box, the ends of said rollers being reduced in diameter and extending into position to engage the inwardly-projecting flanges of said cap-plates, a series of spacing-balls contained within each annular space between said cap-plates and the ends of said bearing-box, said balls being interposed between the ends of said rollers to space the same, and being also mounted in position to engage and take the end thrust between each cap-plate and the corresponding end of said bearing-box.

14. In a bearing, the combination with a bearing-box having a longitudinal and a lateral bearing-surface, of a plurality of rollers supported in position to bear against said longitudinal bearing-surface, a plurality of balls held in position to bear against said lateral bearing-surface, said balls being also interposed between the ends of said rollers to act as spacing members therefor, and a centrally-perforated cap-plate rotatably held to the end of said bearing-box and having a lateral bearing-surface adapted to engage said balls.

15. In a bearing, the combination with a bearing-box having a longitudinal and a lateral bearing-surface, of a plurality of bearing-rollers held in position to engage the longitudinal bearing-surface of said box, a series of balls interposed between the ends of said rollers to act as spacing members therefor, a cap-plate rotatably secured to said bearing-box and having a lateral bearing-surface adapted to engage said balls, the lateral bearing-surface on said bearing-box with which said balls are adapted to engage being angularly disposed with relation to the coöperating lateral bearing-surface of said cap-plate.

16. In a bearing, the combination with a bearing-box having a longitudinal and a lateral bearing-surface, of a cap-plate rotatably held to said bearing-box at one end thereof, said cap-plate having an interior lateral bearing-surface, a series of balls contained between said cap-plate and the end of said bearing-box, said balls being adapted to serve as a thrust-bearing between said bearing-box and rotatable cap-plate, and a plurality of rollers held within said bearing-box in position to engage the inner longitudinal bearing-surface thereof, said balls being interposed between the ends of said rollers and adapted to act as spacing members therefor.

17. In a bearing, the combination with the two relatively rotative members thereof, said members having longitudinally-opposed bearing-surfaces, of a plurality of rollers interposed between the longitudinal bearing-surfaces of said members, a cap-plate secured at one end of said members and arranged to move with one of the same, opposed lateral bearing-surfaces on said cap-plate and the member to which said cap-plate is not secured, said bearing-surfaces being disposed at an angle to each other, a series of balls interposed between said bearing-surfaces, said balls being also interposed between the ends of the aforesaid rollers to serve as spacing members therefor.

18. In a bearing, the combination with the two relatively rotative bearing members thereof, said members having longitudinal and lateral bearing-surfaces, of rolling bearing members interposed between the longitudinal bearing-surfaces of said members, and rolling bearing members interposed between the lateral bearing-surfaces of said members, said last-mentioned bearing members being interposed between said first-mentioned rolling bearing members to serve as spacing members therefor.

19. In a bearing, the combination with two relatively rotative bearing members, each of said members being provided with a longitudinal and a lateral bearing-surface, of rolling bearing members interposed between the longitudinal bearing-surfaces of said members, and rolling bearing members interposed between the lateral bearing-surfaces of said members, said last-mentioned rolling bearing members being interposed between said first-mentioned rolling bearing members to serve as spacing members therefor.

20. In a bearing, the combination with two relatively rotative bearing members thereof, said members having opposed longitudinal and lateral bearing-surfaces, of one set of rolling bearing members interposed between the longitudinal bearing-surfaces of said members, and another set of rolling bearing members interposed between the lateral bearing-surfaces of said members, the rolling bearing members of one of said sets being interposed between the rolling bearing members of the other of said sets to serve as spacing members therefor.

EDWIN J. NEWTON.

Witnesses:
 EDWIN H. SMYTHE,
 LOUIS B. ERWIN.